United States Patent
Feng et al.

(10) Patent No.: US 10,785,019 B2
(45) Date of Patent: Sep. 22, 2020

(54) DATA TRANSMISSION METHOD AND APPARATUS

(71) Applicant: Tencent Technology (Shenzhen) Company Limited, Shenzhen (CN)

(72) Inventors: Li Yi Feng, Shenzhen (CN); Yuan Li Na, Shenzhen (CN); Wang Liang, Shenzhen (CN); Guo Ji Wei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 132 days.

(21) Appl. No.: 15/710,080

(22) Filed: Sep. 20, 2017

(65) Prior Publication Data

US 2018/0013555 A1 Jan. 11, 2018

Related U.S. Application Data

(63) Continuation of application No. PCT/CN2016/102772, filed on Oct. 20, 2016.

(30) Foreign Application Priority Data

Dec. 8, 2015 (CN) .......................... 2015 1 09036959

(51) Int. Cl.
*H04L 9/08* (2006.01)
*H04L 9/14* (2006.01)
(Continued)

(52) U.S. Cl.
CPC .......... *H04L 9/0844* (2013.01); *H04L 9/0822* (2013.01); *H04L 9/0841* (2013.01);
(Continued)

(58) Field of Classification Search
CPC ... H04L 9/0844; H04L 9/0822; H04L 9/0841; H04L 9/14; H04L 9/30; H04L 9/3226;
(Continued)

(56) References Cited

U.S. PATENT DOCUMENTS 9,763,984 B2 * 9/2017 Feng .................... A61K 35/19
10,169,252 B2 * 1/2019 Axnix .................. H04L 9/0891
(Continued)

FOREIGN PATENT DOCUMENTS

CN     1331874 A       1/2002
CN   101588538 A   *  11/2009
(Continued)

OTHER PUBLICATIONS

Otrok, H. et al., "Improving the Security of SNMP in Wireless Networks," 2005 International Conference on Wireless Networks, Communications and Mobile Computing (IEEE), Dec. 31, 2005, pp. 198-202.
(Continued)

*Primary Examiner* — Yonas A Bayou
(74) *Attorney, Agent, or Firm* — Brinks Gilson & Lione

(57) ABSTRACT

A data transmission method and apparatus are disclosed that resolves a technical problem where an existing data encryption algorithm offers poor security during transmission of data. The solution includes obtaining, by a first terminal, a data transmission request sent by a second terminal, the data transmission request at least carrying first encrypted data that is obtained by encrypting first exchange key of the second terminal by using a private key of the second terminal. The solution further includes decrypting, by the first terminal, the first encrypted data by using a public key of the second terminal to obtain the first exchange key, and obtaining a shared key of the first terminal and the second terminal according to the first exchange key. The solution further includes encrypting, by the first terminal, to-be-transmitted data by using the shared key to obtain encrypted to-be-transmitted data, and sending the encrypted to-be-transmitted data to the second terminal.

14 Claims, 7 Drawing Sheets

(51) Int. Cl.
*H04L 9/30* (2006.01)
*H04L 9/32* (2006.01)
*H04L 29/06* (2006.01)

(52) U.S. Cl.
CPC .................. *H04L 9/14* (2013.01); *H04L 9/30* (2013.01); *H04L 9/3226* (2013.01); *H04L 9/3247* (2013.01); *H04L 9/3297* (2013.01); *H04L 63/045* (2013.01); *H04L 63/123* (2013.01)

(58) Field of Classification Search
CPC ... H04L 9/3247; H04L 9/3297; H04L 63/045; H04L 63/123
See application file for complete search history.

(56) References Cited

U.S. PATENT DOCUMENTS

| | | | | |
|---|---|---|---|---|
| 10,282,311 | B2* | 5/2019 | Axnix | H04L 9/0891 |
| 10,338,827 | B2* | 7/2019 | George | H04L 9/0894 |
| 10,635,328 | B2* | 4/2020 | George | H04L 9/0894 |
| 2003/0172278 | A1* | 9/2003 | Farnham | H04L 63/0435 |
| | | | | 713/176 |
| 2003/0210789 | A1* | 11/2003 | Farnham | H04L 9/0844 |
| | | | | 380/270 |
| 2009/0254751 | A1* | 10/2009 | Fujiwara | H04L 9/0844 |
| | | | | 713/171 |
| 2010/0211779 | A1* | 8/2010 | Sundaram | H04L 9/3073 |
| | | | | 713/168 |
| 2010/0275023 | A1* | 10/2010 | Fujiwara | H04L 9/0844 |
| | | | | 713/171 |
| 2012/0102323 | A1* | 4/2012 | Lin | H04L 9/3271 |
| | | | | 713/168 |
| 2012/0144200 | A1* | 6/2012 | Liu | H04L 9/0844 |
| | | | | 713/171 |
| 2013/0325994 | A1* | 12/2013 | Chai | H04L 67/1097 |
| | | | | 709/208 |
| 2014/0281576 | A1 | 9/2014 | Suzuki | |
| 2015/0229473 | A1 | 8/2015 | Klein et al. | |

FOREIGN PATENT DOCUMENTS

| | | |
|---|---|---|
| CN | 101588538 A | 11/2009 |
| CN | 102318258 A | 1/2012 |
| CN | 105553951 A | 5/2016 |
| WO | WO-2012055204 A1 * | 5/2012 ........ H04W 12/1202 |

OTHER PUBLICATIONS

Zhao, Yue-Hua et al., "Employing DH-EKE Scheme to Enhance WTLS Security," Computer Engineering and Design vol. 28, No. 8, Apr. 30, 2007, pp. 1801-1803.
International Search Report and Written Opinion dated Jan. 20, 2017 for PCT Application No. PCT/CN2016/102772, 11 pages.
Office Action dated Mar. 12, 2019 for Chinese Application No. 201510903695.9, 17 pages.

* cited by examiner

200

| A first terminal obtains a data transmission request sent by a second terminal, the data transmission request at least carrying first encrypted data that is obtained by encrypting first exchange key of the second terminal by using a private key of the second terminal | S201 |

↓

| The first terminal decrypts the first encrypted data by using a public key of the second terminal to obtain the first exchange key, and obtains a shared key of the first terminal and the second terminal according to the first exchange key | S203 |

↓

| The first terminal encrypts to-be-transmitted data by using the shared key to obtain encrypted to-be-transmitted data, and sends the encrypted to-be-transmitted data to the second terminal | S205 |

FIG. 2

DATA TRANSMISSION METHOD AND APPARATUS

CROSS-REFERENCE TO RELATED APPLICATION(S)

This application is a continuation of Patent Cooperation Treaty Patent Application No. PCT/CN2016/102772, filed on Oct. 20, 2016, which claims priority to Chinese Patent Application No. 2015109036959, filed with the Chinese Patent Office on Dec. 8, 2015 and entitled "DATA TRANSMISSION METHOD AND APPARATUS", all of which are incorporated herein by reference in their entirety.

FIELD OF THE TECHNOLOGY

Embodiments of the present disclosure relate to the field of data processing, and in particular, to a data transmission method and apparatus.

BACKGROUND

As network information develops, networks affect all aspects of people's life, accompanying requirements on security become increasingly high, and requirements of people on secrecy in network activities become increasingly high. An application data encryption technology ensures requirements of people on secrecy of their data and some related materials in the network activities, and ensures security and secrecy of the networks.

The data encryption technology is a core technology of data security, and especially in the current time in which various network services such as e-commerce, digital currency, and network banks emerge rapidly, problems such as how to protect data security so that data is not stolen, modified, or broken, increasingly attract people's attention. A key to resolve the problems is the data encryption technology. Referred encryption, is a process of converting readable data of a "cleartext" into a "ciphertext"; and decryption is a process of restoring the "ciphertext" to the "cleartext". Both encryption and decryption may be implemented by using a cipher algorithm. The cipher algorithm refers to a computable process for hiding and exposing data. Usually, a complex algorithm indicates a securer result ciphertext. In the encryption technology, a key is unnecessary. The key is a value that causes the cipher algorithm to operate according to a particular manner and generate a particular ciphertext.

A symmetric algorithm in the existing technology may also be referred to as a conventional cryptographic algorithm, meaning that an encryption key can be reckoned from a decryption key, and a decryption key can be reckoned from an encryption key. In most symmetric algorithms, keys for encryption/decryption are the same. The algorithms are also referred to as secret-key or single-key algorithms, which require a sender and a receiver to agree upon a key before performing secure communication. Security of the symmetric algorithm depends on the key, and disclosure of the key means that any person can encrypt/decrypt a message. Therefore, the symmetric algorithm means that a same key is used in an encryption process and a decryption process, and in the symmetric algorithm, the key needs to be kept as secret as long as communication needs to be kept as secret.

Although the symmetric algorithm has high efficiency, transmission of the key may use an additional channel. An asymmetric Diffie-Hellman (DH) algorithm can resolve the transmission problem. However, because security of the algorithm is based on solving of discrete logarithms in a finite field and the solving is very difficult, and the algorithm is a non-authenticated key exchange protocol, a man-in-the-middle attack still exists.

Specifically, in an example where Alice publicly sends values: a and p to Bob, and an attacker Carol intercepts the values and sends a public value generated by Carol to Bob. Bob publicly sends values: a and p to Alice, the values are also intercepted by Carol, and Carol sends a public value generated by Carol to Alice. In this case, Alice and Bob obtain the public values sent by Carol, Alice and Carol calculate a shared key k1 between Alice and Carol; and Bob and Carol calculate another shared key k2 between Bob and Carol. As described above, after attacked by a man in the middle Carol, Alice sends a message to Bob by using the key k1, and after Carol intercepts the message, Carol may read the message after decrypting the message by using k1, encrypt the cleartext message by using k2 (before encryption, Carol may make some modifications on the message, that is, an active attack), and then send the message to Bob. For the message sent by Bob to Alice, Carol reads and modifies the message in a same method.

Currently, there are no effective solutions provided, to the problem that the existing encryption algorithm has poor security during data transmission.

SUMMARY

Embodiments of the present disclosure provide a data transmission method and apparatus, to resolve a technical problem that an existing encryption algorithm has poor security during data transmission.

According to an aspect of the embodiments of the present disclosure, a data transmission method is provided, and the method includes: obtaining, by a first terminal, a data transmission request sent by a second terminal, the data transmission request at least carrying first encrypted data that is obtained by encrypting first exchange key of the second terminal by using a private key of the second terminal; decrypting, by the first terminal, the first encrypted data by using a public key of the second terminal to obtain the first exchange key, and obtaining a shared key of the first terminal and the second terminal according to the first exchange key; and encrypting, by the first terminal, to-be-transmitted data by using the shared key to obtain encrypted to-be-transmitted data, and sending the encrypted to-be-transmitted data to the second terminal.

According to another aspect of the embodiments of the present disclosure, a data transmission apparatus is provided, and the apparatus includes: an obtaining unit, configured to obtain a data transmission request sent by a second terminal, the data transmission request at least carrying first encrypted data that is obtained by encrypting first exchange key of the second terminal by using a private key of the second terminal; a key processing unit, configured to: decrypt the first encrypted data by using a public key of the second terminal to obtain the first exchange key, and obtain a shared key of the first terminal and the second terminal according to the first exchange key; and an encryption and transmission unit, configured to: encrypt to-be-transmitted data by using the shared key to obtain encrypted to-be-transmitted data, and send the encrypted to-be-transmitted data to the second terminal.

In the embodiments of the present disclosure, when exchange keys of a second terminal and a first terminal are exchanged by using the DH algorithm (the exchange keys may be public values of the DH algorithm of the two terminals), the second terminal encrypts the exchange key by using a RSA algorithm (e.g., asymmetric public-private key cryptosystem), that is, the second terminal encrypts the exchange key by using a private key of the second terminal, and the first terminal decrypts the exchange key by using a public key of the second terminal, to obtain the exchange key of the second terminal and obtain a shared key of the second terminal and the first terminal. In the foregoing process, an attacker needs to decrypt an encrypted exchange key before launching a man-in-the-middle attack, thereby increasing the decryption difficulty. By the foregoing solution, security in a data transmission process is improved, and a technical problem that an encryption algorithm existing in the existing technology has poor security during data transmission is resolved.

BRIEF DESCRIPTION OF THE DRAWINGS

The accompanying drawings described herein are intended to provide further understanding of the embodiments of the present disclosure and constitute a part of this application. The exemplary embodiments of the embodiments of the present disclosure and descriptions thereof are intended to explain the embodiments of the present disclosure, and not to constitute an improper limitation to the embodiments of the present disclosure. In the accompanying drawings:

FIG. 2 is a flowchart of an optional data transmission method according to an embodiment of the present disclosure;

DETAILED DESCRIPTION

To make a person skilled in the art understand the technical solutions in the embodiments of present disclosure better, the following clearly and completely describes the technical solutions in the embodiments of the present disclosure with reference to the accompanying drawings in the embodiments of the present disclosure. Apparently, the described embodiments are merely a part rather than all of the embodiments of the embodiments of the present disclosure. All other embodiments obtained by a person of ordinary skill in the art based on the embodiments of the present disclosure without creative efforts shall fall within the protection scope of the embodiments of the present disclosure.

It should be noted that in the specification, claims, and accompanying drawings of the embodiments of present disclosure, the terms "first", "second", and so on are intended to distinguish between similar objects but do not necessarily indicate a specific order or sequence. It should be understood that data used in this way is exchangeable in a proper case, so that the embodiments of the present disclosure described herein can be implemented in another order except those shown or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

According to an embodiment of the present disclosure, an exemplary data transmission method is provided. It should be noted that, steps shown in the flowcharts of the accompanying drawings may be performed in, for example, a computer system having a set of computer executable instructions. Moreover, although logical sequences are shown in the flowcharts, in some cases, the steps that are shown or described may be performed in a sequence different from those shown herein.

Figure 1:
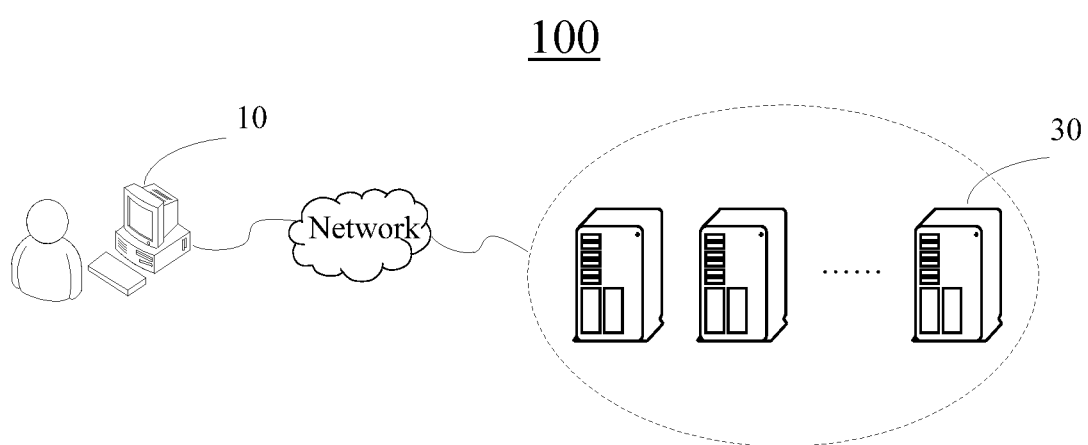
FIG. 1 is a schematic diagram of a network environment of a terminal according to an embodiment of the present disclosure.

Optionally, in this embodiment, the data transmission method may be applied to a hardware environment 100 formed by a second terminal 10 and a first terminal 30 as shown in FIG. 1, where the second terminal 10 may establish a connection to the first terminal 30 through a network. Included in the second terminal 10 and the first terminal 30, a processor and an encryption apparatus may be disposed.

The network shown in the hardware environment 100 includes, but is not limited to, a wide area network, a metropolitan area network, or a local area network. Preferably, the network is a local area network.

In this embodiment of the present disclosure, details of a related encryption manner by using the RSA algorithm are as follows:

The second terminal 10 constructs a key pair, and the key pair includes a public key and a private key. After constructing the key pair, the second terminal 10 publicizes the public key to the first terminal 30, and reserves the private key. The second terminal 10 encrypts to-be-transmitted data by using the private key of the second terminal 10, then signs a signature on the encrypted data by using the private key of the second terminal 10 to generate a signature file, and sends the signature file and the encrypt data to the first terminal 30.

After receiving the signature file and the encrypted data, the first terminal 30 verifies whether received encrypted data is valid by using the public key of the second terminal 10 and the signature file. If the received encrypted data is valid, data is decrypted by using the public key of the second terminal 10.

The first terminal 30 encrypts the data by using the public key of the second terminal 10, and sends the encrypted data to a sender (that is, the second terminal 10). The second terminal 10 obtains the encrypted data, and decrypts the data by using the private key of the second terminal 10.

That the first terminal 30 verifies whether the received encrypted data is valid may be implemented by the following steps:

The first terminal 30 decrypts a received signature by using the public key of the second terminal 10, generates abstract information of the encrypted data by using the public key of the second terminal 10, and then compares the decrypted signature and the abstract information that generates the encrypted data. If the two are the same, it is considered that the received encrypted data is valid, or if the two are different, it indicates that the received encrypted data is invalid, and the data may have been modified.

This embodiment further relates to a key exchange (Diffie-Hellman, that is the DH) algorithm. In the algorithm, a second terminal A and a first terminal B exchange keys, and after the keys are exchanged, the two terminals separately calculate a shared key of the two terminals and encrypt data by using the shared key. Specific implementations are as follows:

Before the second terminal A and the first terminal B encrypt to-be-transmitted data for communication, the two terminals agree upon two large integers n and g, and the two integers may be public.

(1) The second terminal A randomly generates a large integer a (a needs to be kept as secret), and then calculates Ka=ga mod n.

(2) The first terminal B randomly generates a large integer b (b needs to be kept as secret), and then calculates Kb=gb mod n.

(3) The second terminal A sends Ka and n to the first terminal B as a public value of the DH algorithm; and the first terminal B sends Kb and n to the second terminal A as a public value of the DH algorithm.

(4) The second terminal A calculates the shared key of the second terminal and the first terminal: K=Kba mod n.

(5) The first terminal B calculates the shared key of the second terminal and the first terminal: K=Kab mod n.

In the foregoing manner, because Kba mod n=(gb mod n) a mod n=(ga mod n) b mod n, it can be ensured that the two terminals obtain a same K, that is, K is the shared key of the two terminals.

According to an embodiment of the present disclosure, a data transmission method is provided by flow chart 200. As shown in FIG. 2, the method includes the following steps:

Step S201: A first terminal obtains a data transmission request sent by a second terminal, the data transmission request at least carrying first encrypted data that is obtained by encrypting first exchange key of the second terminal by using a private key of the second terminal.

Step S203: The first terminal decrypts the first encrypted data by using a public key of the second terminal to obtain the first exchange key, and obtains a shared key of the first terminal and the second terminal according to the first exchange key.

The shared key may be obtained by using an algorithm of a shared key in the DH algorithm.

Step S205: The first terminal encrypts to-be-transmitted data by using the shared key to obtain encrypted to-be-transmitted data, and sends the encrypted to-be-transmitted data to the second terminal.

By the foregoing embodiment, when exchange keys of a second terminal and a first terminal are exchanged by using the DH algorithm (the exchange keys may be public values of the DH algorithm of the two terminals), the second terminal encrypts the exchange key by using the RSA algorithm, that is, the second terminal encrypts the exchange key by using a private key of the second terminal, and the first terminal decrypts the exchange key by using a public key of the second terminal, to obtain the exchange key of the second terminal and obtain a shared key of the second terminal and the first terminal. In the foregoing process, an attacker needs to decrypt an encrypted exchange key before launching a man-in-the-middle attack, thereby increasing the decryption difficulty. By the foregoing solution, security in a data transmission process is improved, and a technical problem that an encryption algorithm existing in the existing technology has poor security during data transmission is resolved.

In the DH algorithm, Ka and n sent by the second terminal A to the first terminal B are the first exchange key of the second terminal in the embodiments of this application. The second terminal encrypts the first exchange key of the second terminal by using the public key cipher RSA algorithm.

In the foregoing embodiment, the second terminal encrypts, by using the private key of the second terminal, the first exchange key (that is, an exchange text or a public value) generated by the DH algorithm to generate an unreadable ciphertext Dsk (that is, the first encrypted data in the foregoing embodiment), and then transmits the first encrypted data Dsk to the first terminal. After receiving the first encrypted data, the first terminal performs decryption Decrypt operation by using the public key of the second terminal, to obtain the first exchange key. Optionally, after receiving the first encrypted data, the first terminal may perform signature verification on the first encrypted data by using the public key, and decrypt the first encrypted data if the verification succeeds.

By the foregoing embodiment, the second terminal encrypts and transmits, by using the RSA algorithm, the public value (that is, the first exchange key in the foregoing embodiment) generated by the DH algorithm, so that after intercepting the data transmission request, an attacker needs to decrypt the RSA algorithm before launching a man-in-the-middle attack, thereby increasing the decryption difficulty.

According to the foregoing embodiment of the present disclosure, before the sending the encrypted to-be-transmitted data to the second terminal, the method further includes: encrypting, by the first terminal, a second key public value of the first terminal by using the public key of the second terminal to obtain second encrypted data, and sending the second encrypted data to the second terminal, the second key public value being used for indicating the shared key obtained by the second terminal.

After the sending the encrypted to-be-transmitted data to the second terminal, the method further includes: decrypting, by the second terminal, the encrypted to-be-transmitted data by using the shared key to obtain the to-be-transmitted data, the shared key being obtained by the second terminal according to the second key public value after the second terminal decrypts the second encrypted data by using the private key of the second terminal to obtain the second key public value.

Specifically, after the first terminal decrypts the first encrypted data by using the public key of the second terminal to obtain the first exchange key, the first terminal encrypts a second exchange key of the first terminal by using the private key of the first terminal to obtain second encrypted data, and sends the second encrypted data to the second terminal; and the second terminal decrypts the second encrypted data by using the public key of the first terminal to obtain the second exchange key, and obtains the shared key according to the second exchange key.

After the first terminal sends the encrypted data to the second terminal, the second terminal decrypts the encrypted data by using the shared key to obtain the to-be-transmitted data.

It should be noted that in the DH algorithm, Kb and n sent by the first terminal B to the second terminal A are the second exchange key of the first terminal in the embodiments of this disclosure.

In the foregoing embodiment, when sending the second exchange key of the first terminal to the second terminal, the first terminal also encrypts the second exchange key by using the public key of the second terminal to obtain the second encrypted data, and sends the second encrypted data to the second terminal. After receiving the second encrypted data, the second terminal decrypts the second encrypted data by using the private key of the second terminal to obtain the second exchange key, and obtains the shared key (the shared key is obtained by using the algorithm of the shared key in the DH algorithm) according to the second exchange key.

By the foregoing embodiment of the present disclosure, when the second terminal and the first terminal exchange their exchange keys, the second terminal and the first terminal can encrypt the exchange keys of the two terminals by using the RSA algorithm, so that after intercepting the data transmission request, an attacker needs to decrypt the RSA algorithm before launching a man-in-the-middle attack, thereby increasing the decryption difficulty.

Further, after obtaining the shared key, the second terminal and the first terminal may encrypt the to-be-transmitted data by using the shared key.

Figure 3:
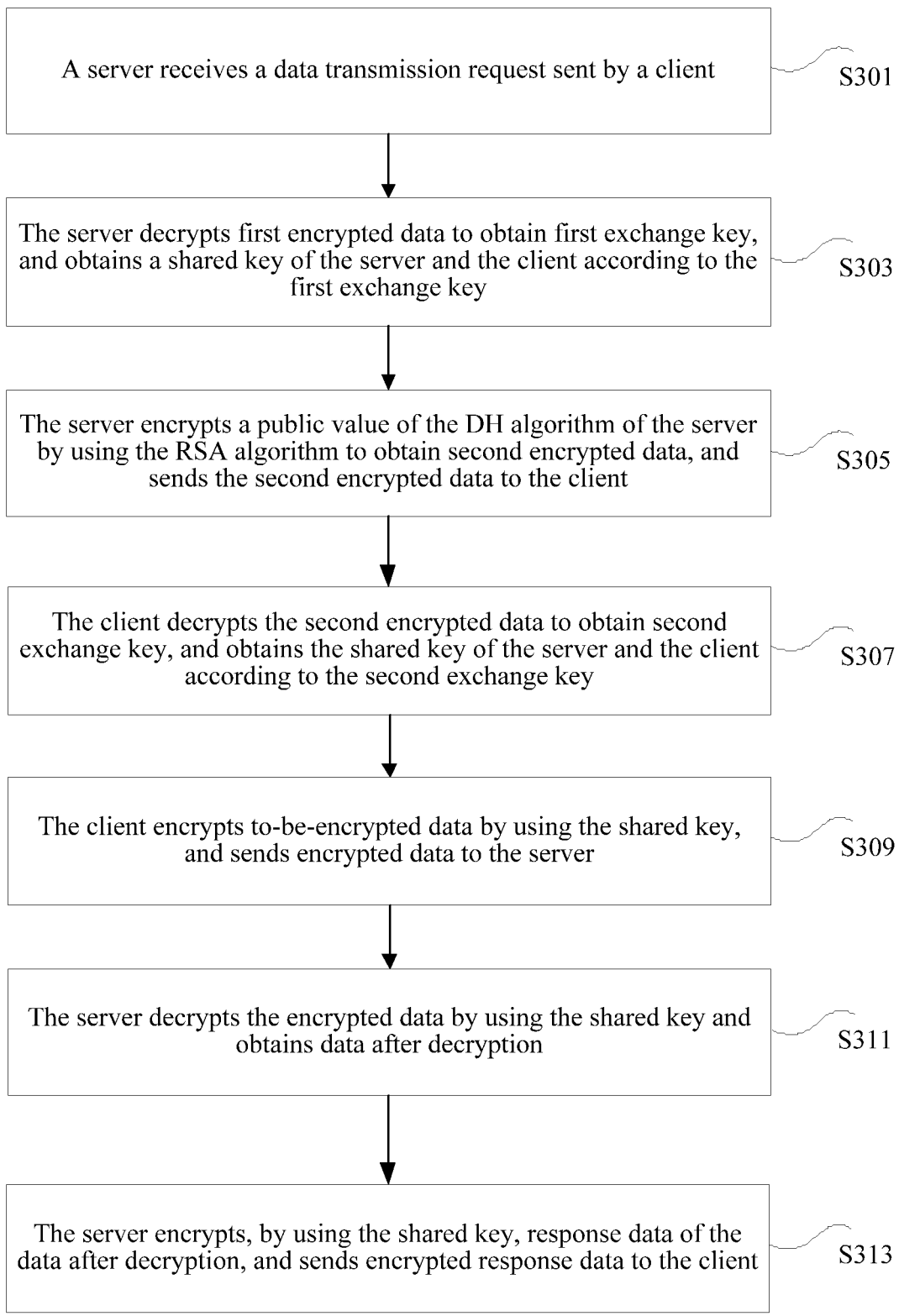
FIG. 3 is a flowchart of another optional data transmission method according to an embodiment of the present disclosure.

Embodiments of the present disclosure are detailed with reference to flow chart 300 shown in FIG. 3 of an exemplary process in which the second terminal is a client, and the first terminal is a server. As shown by flow chart 300 in FIG. 3, this process may include the following steps:

Step S301: A server receives a data transmission request sent by a client, the data transmission request at least carrying first encrypted data that is obtained by encrypting a public value of the DH algorithm of the client by using the RSA algorithm.

Step S303: The server decrypts the first encrypted data to obtain first exchange key, and obtains a shared key of the server and the client according to the first exchange key.

The shared key may be obtained by using an algorithm of a shared key in the DH algorithm.

Step S305: The server encrypts a public value of the DH algorithm of the server by using the RSA algorithm to obtain second encrypted data, and sends the second encrypted data to the client.

Step S307: The client decrypts the second encrypted data to obtain second exchange key, and obtains the shared key of the server and the client according to the second exchange key.

Step S309: The client encrypts to-be-encrypted data by using the shared key, and sends encrypted data to the server.

Step S311: The server decrypts the encrypted data by using the shared key and obtains data after decryption.

Step S313: The server encrypts, by using the shared key, response data of the data after decryption, and sends encrypted response data to the client.

After receiving the encrypted response data, the client may decrypt the encrypted response data by using the shared key.

It should be noted that in this embodiment, the server and the client may agree upon the time to start communication between each other and the party who sends first communication data.

According to the foregoing embodiment of the present disclosure, the data transmission request further carries verification information of the second terminal, and the decrypting, by the first terminal, the first encrypted data by using a public key of the second terminal to obtain the first exchange key may include: verifying, by the first terminal, validity of the data transmission request by using the verification information of the second terminal; and decrypting, by the first terminal, the first encrypted data by using the public key of the second terminal to obtain the first exchange key, if it is verified that the data transmission request is a valid request.

Specifically, before decrypting the first exchange key, the server needs to verify validity of a source of the data transmission request. Optionally, besides the first encrypted data, the data transmission request further carries the verification information of the second terminal, and the first terminal verifies the validity of the data transmission request by the verification information. If the data transmission request is a valid request, the first terminal decrypts the first encrypted data.

By the foregoing embodiment, validity of the second terminal may be effectively verified, so as to avoid an access by a decrypted second terminal to the first terminal.

Specifically, verifying, by the first terminal, the validity of the data transmission request by using the verification information of the second terminal may include: obtaining, from the verification information, an encrypted signature obtained by encrypting, by using the private key of the second terminal, a signature installed on an application program of the second terminal, the application program being used for generating the data transmission request, and the signature of the application program being used for recording author information of the application program; decrypting the encrypted signature by using the public key of the second terminal, to obtain the signature of the application program; and determining whether the data transmission request is valid based on the signature of the application program obtained by decryption.

Further, determining whether the data transmission request is valid based on the signature of the application program obtained by decryption may include: comparing whether the signature of the application program obtained by decryption is the same as a signature of the application program pre-stored in the first terminal; and determining that the data transmission request is valid, if it is found after comparison that the signature of the application program obtained by decryption is the same as the signature of the first terminal pre-stored in the application program; or determining that the data transmission request is invalid, if it is found after comparison that the signature of the application program obtained by decryption is not the same as the signature of the first terminal pre-stored in the application program.

In the foregoing embodiment, the second terminal may encrypt and transmit the signature of the application program by using the RSA algorithm, and add encrypted signature to the data transmission request and send the data transmission request to the first terminal. After receiving the data transmission request, the server extracts the encrypted signature from the data transmission request, and decrypts the encrypted signature to obtain the signature of the application program after decryption. If the signature of the application program after decryption is the same as the signature of the application program stored in the first terminal, it is determined that the source of the data transmission request is valid.

The application program in the foregoing embodiment may be an android application program, and the signature of the application program may be an android signature file. Due to uniqueness of an android signature, if an attacker succeeds in decrypting the second terminal but lacks the android signature file, the first terminal still identifies that the data transmission request is an invalid request. In this embodiment, by the signature of the application program, it may further ensure that an invalid terminal cannot access the first terminal.

It should be further noted that the obtaining an encrypted signature obtained by encrypting, by using the private key of the second terminal, a signature installed on an application program of the second terminal includes: obtaining the encrypted signature that is obtained by encrypting an information abstract of the signature of the application program by using the private key of the second terminal.

Optionally, in the foregoing embodiment, before the signature of the application program is encrypted by using the RSA algorithm, an MD5 value of the signature of the application program may be calculated by using the MD5 algorithm. That is, the MD5 value of the signature of the application program is encrypted by using the RSA algorithm to obtain the encrypted signature, so that the signature of the application program is strictly kept as secret.

The application program in the foregoing embodiment may be an instant-messaging program (for example, QQ and WeChat), an intelligent taxi-hailing program, a payment program, and the like. This is not limited in this embodiment of the present disclosure.

It should be noted that the signature of the application program and the public value of the DH algorithm may be encrypted as an entity by using the RSA algorithm; or the signature of the application program and the public value of the DH algorithm may be separately encrypted by using the RSA algorithm. This is not limited in this application.

The foregoing embodiment is detailed below by using an example in which the second terminal is a client, the application program is an android WeChat program, and the first terminal is a server of the WeChat program.

When a WeChat program of the client needs to access the server, the WeChat program obtains a WeChat android signature set for the WeChat program by a developer (that is, the author of the program) when the developer makes a research and development on the WeChat program, calculates an MD5 value of the WeChat android signature by using the MD5 algorithm, encrypts the MD5 value of the WeChat android signature by using the RSA algorithm to obtain an encrypted signature. When encrypting the WeChat android signature, the WeChat program may further calculate a public value of the DH algorithm, and encrypt the public value of the DH algorithm by using the RSA algorithm to obtain first encrypted data.

After obtaining the encrypted signature and the first encrypted data, the WeChat program adds the two pieces of data to a data transmission request, and sends the data transmission request to the WeChat server.

After receiving the data transmission request and verifying the signature of the data transmission request, the WeChat server decrypts the encrypted signature to obtain a WeChat android signature after decryption. If the WeChat android signature obtained by decryption is the same as a signature of the WeChat application program recorded in the WeChat server, the WeChat server determines that the data transmission request is a valid request, and may decrypt the first encrypted data to obtain a shared key of the server and the client.

In the foregoing embodiment, due to uniqueness of an android signature, if an attacker succeeds in decrypting the client but lacks the android signature file, the server still identifies that the data transmission request is an invalid request, and further avoids an access by the decrypted client to the server by the verification program.

In an optional embodiment, the verifying, by the first terminal, validity of the data transmission request by using the verification information of the second terminal includes: obtaining, from the verification information, an encrypted time stamp that is obtained by encrypting a requested time stamp by using the private key of the second terminal, the requested time stamp being used for recording a time point at which the second terminal generates the data transmission request; decrypting the encrypted time stamp by using the public key of the second terminal, to obtain the requested time stamp; obtaining a terminal identifier of the second terminal from the data transmission request; obtaining a recorded time stamp that is recorded in the first terminal and that has the terminal identifier; and determining that the data transmission request is invalid, if the requested time stamp obtained by decryption is the same as the recorded time stamp recorded in the first terminal.

Optionally, after the requested time stamp is obtained by decrypting the encrypted time stamp, a historical time stamp (that is, the recorded time stamp) the same as the requested time stamp may be searched for from historical information recorded by the first terminal. If the historical time stamp exists, and the historical time stamp is the same as a terminal identifier corresponding to the requested time stamp, it is determined that the data transmission request is invalid; otherwise, the data transmission request is valid.

In the foregoing embodiment, to effectively prevent the first terminal from being attacked by a simulated request, the data transmission request may be verified by using the time stamp in the data transmission request.

Specifically, the time stamp at which the application program of the second terminal generates the data transmission request may be encrypted to obtain the encrypted time stamp, and the encrypted time stamp is sent to the first terminal along with the data transmission request.

In the foregoing embodiment, after receiving the data transmission request, the first terminal decrypts the encrypted time stamp in the data transmission request to obtain time stamp after decryption. For each received data transmission request, the first terminal performs the foregoing operation, and records a time stamp after decryption and an identifier of the terminal that sends the data transmission request. Each time obtaining a new time stamp, the first terminal searches for a historical time stamp consistent with a terminal identifier of the new time stamp, and if the historical time stamp is also consistent with the new time stamp, it is also considered that the data transmission request is an invalid request.

Optionally, if the historical time stamp is consistent with the new time stamp, it may further be determined that a historical data transmission request corresponding to the historical time stamp is also an invalid request.

It should be noted that the signature of the application program, the time stamp, and the public value of the DH algorithm may be encrypted as an entity by using the RSA algorithm; or the signature of the application program, the time stamp, and the public value of the DH algorithm may be separately encrypted by using the RSA algorithm. This is not limited in this application.

In another optional embodiment, the first terminal may determine whether the data transmission request is a valid request based on a co-verified result of the signature of the application program and the requested time stamp.

Specifically, if the signature of the application program obtained by decryption is the same as the signature of the application program stored in the first terminal, and the recorded time stamp that is recorded in the first terminal and that has the terminal identifier does not have a time stamp the same as the requested time stamp obtained by decryption, it is determined that the data transmission request is valid. Otherwise, the data transmission request is invalid.

In the foregoing embodiment of the present disclosure, the first terminal is a server, and the second terminal is a client; or the second terminal is a server, and the first terminal is a client.

Figure 4:
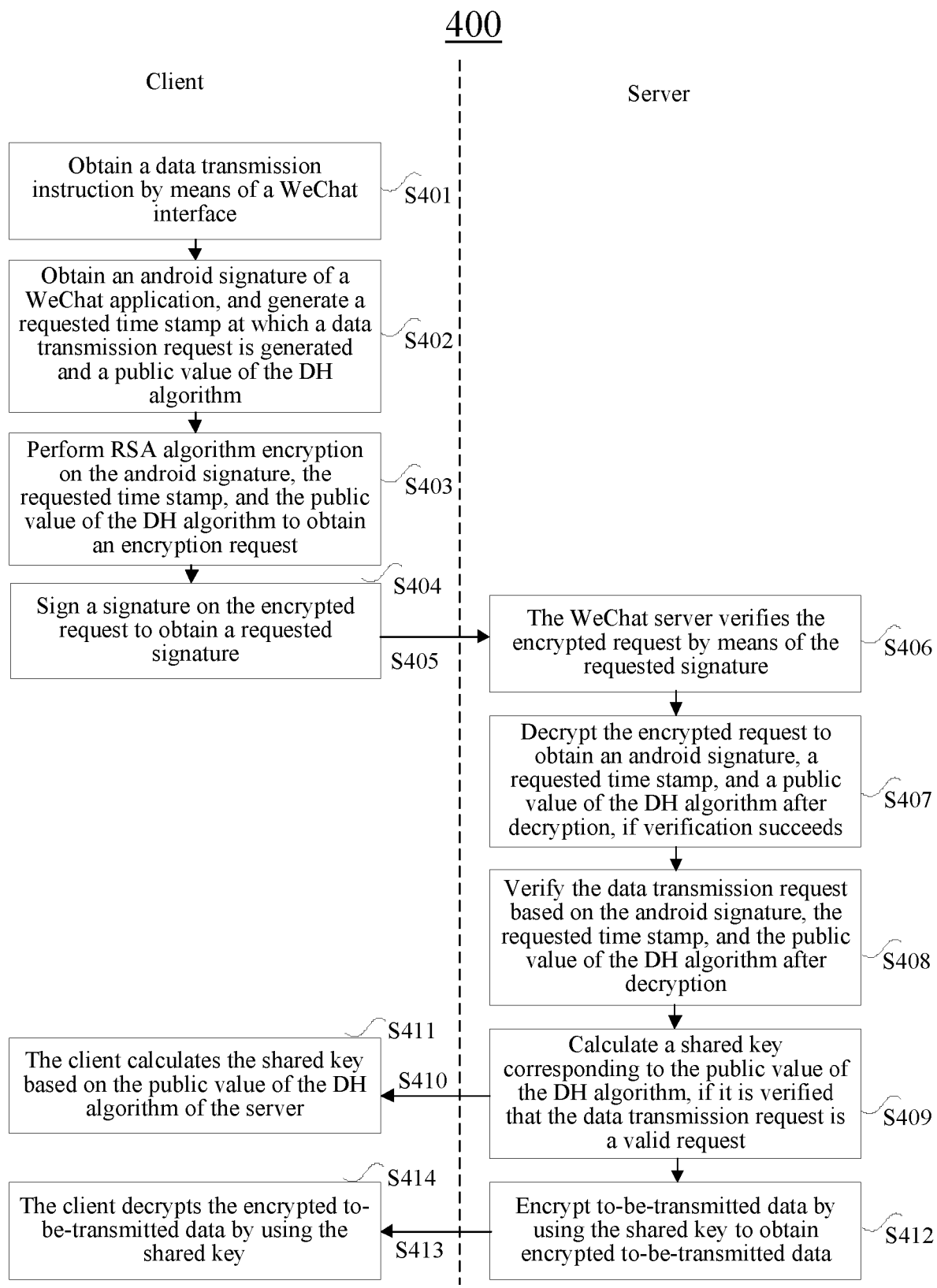
FIG. 4 is a flowchart of still another optional data transmission method according to an embodiment of the present disclosure.

The embodiments of the present disclosure are detailed with reference to the exemplary process described by flow chart 400 shown in FIG. 4 in which the first terminal is a server, the second terminal is a client, and the application program is a WeChat application. As shown by the flow chart 400 in FIG. 4, this process may be implemented by the following steps:

Step S401: Obtain a data transmission instruction by a WeChat interface.

Specifically, a user may generate the instruction by operating an interface of a WeChat application interface installed on the client. The operation may include a click operation, a touch and hold operation, and the like.

Step S402: Obtain an android signature of a WeChat application, and generate a requested time stamp at which a data transmission request is generated and a public value of the DH algorithm.

Step S403: Perform RSA algorithm encryption on the android signature, the requested time stamp, and the public value of the DH algorithm to obtain an encryption request.

Step S404: Sign a signature on the encrypted request to obtain a requested signature.

Step S405: Send the encrypted request and the requested signature to a WeChat server.

Step S406: The WeChat server verifies the encrypted request by the requested signature.

A verification manner is the same as those in the foregoing embodiments, and is not described herein again.

Step S407: Decrypt the encrypted request to obtain an android signature, a requested time stamp, and a public value of the DH algorithm after decryption, if verification succeeds.

Step S408: Verify the data transmission request based on the android signature, the requested time stamp, and the public value of the DH algorithm after decryption.

A verification manner is the same as those in the foregoing embodiments, and is not described herein again.

Step S409: Calculate a shared key corresponding to the public value of the DH algorithm, if it is verified that the data transmission request is a valid request.

Step S410: The server sends the public value of the DH algorithm of the server to a client.

Step S411: The client calculates the shared key based on the public value of the DH algorithm of the server.

Step S412: Encrypt to-be-transmitted data by using the shared key to obtain encrypted to-be-transmitted data.

Step S413: The server sends the encrypted to-be-transmitted data to the client.

Step S414: The client decrypts the encrypted to-be-transmitted data by using the shared key.

A sending and receiving process of response data between the server and the client are not shown in this embodiment, and the sending and receiving process of the response data between the server and the client are not limited in this application.

It should be noted that, for simple description, the foregoing method embodiments are represented as a combination of a series of actions, but a person skilled in the art should appreciate that the embodiments of the present disclosure are not limited to the described order of the actions because some steps may be performed in another order or performed simultaneously according to the embodiments of the present disclosure. In addition, a person skilled in the art should also appreciate that all the embodiments described in this specification are preferred embodiments, and the related actions and modules are not necessarily mandatory to the embodiments of the present disclosure.

Through the foregoing descriptions of the implementations, it is clear to a person skilled in the art that the method according to the foregoing embodiments may be implemented by software plus a necessary universal hardware platform, and certainly may also be implemented by hardware, but in many cases, the software implementation is preferred. Based on such understanding, the technical solutions of the embodiments of the present disclosure or the part that makes contributions to the existing technology may be substantially embodied in the form of a software product. The computer software product is stored in a storage medium (for example, a ROM/RAM, a magnetic disk, or an optical disc), and contains several instructions for instructing a terminal device (which may be a mobile phone, a computer, a first terminal, or a network device) to perform the method according to the embodiments of the present disclosure.

Figure 5:
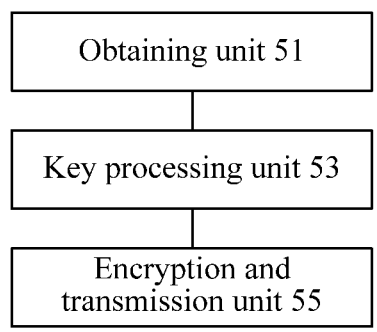
FIG. 5 is a schematic diagram of an optional data transmission apparatus according to an embodiment of the present disclosure.

According to another embodiment of the present disclosure, a data transmission apparatus 500 for implementing the data transmission method is provided. As shown in FIG. 5, the data transmission apparatus 500 includes: an obtaining unit 51, a key processing unit 53, and an encryption and transmission unit 55.

The obtaining unit 51 is configured to obtain a data transmission request sent by a second terminal, the data transmission request at least carrying first encrypted data that is obtained by encrypting first exchange key of the second terminal by using a private key of the second terminal.

The key processing unit 53 is configured to: decrypt the first encrypted data by using a public key of the second terminal to obtain the first exchange key, and obtain a shared key of the first terminal and the second terminal according to the first exchange key.

The encryption and transmission unit 55 is configured to: encrypt to-be-transmitted data by using the shared key to obtain encrypted to-be-transmitted data, and send the encrypted to-be-transmitted data to the second terminal.

By the foregoing embodiment, when exchange keys of a second terminal and a first terminal are exchanged by using the DH algorithm (the exchange keys may be public values of the DH algorithm of the two terminals), the second terminal encrypts the exchange key by using the RSA algorithm, that is, the second terminal encrypts the exchange key by using a private key of the second terminal, and the first terminal decrypts the exchange key by using a public key of the second terminal, to obtain the exchange key of the second terminal and obtain a shared key of the second terminal and the first terminal. In the foregoing process, an attacker needs to decrypt an encrypted exchange key before launching a man-in-the-middle attack, thereby increasing the decryption difficulty. By the foregoing solution, security in a data transmission process is improved, and a technical problem that an encryption algorithm existing in the existing technology has poor security during data transmission is resolved.

In the DH algorithm, Ka and n sent by the second terminal A to the first terminal B are the first exchange key of the second terminal in the embodiments of this application. The second terminal encrypts the first exchange key of the second terminal by using the public key cipher RSA algorithm.

In the foregoing embodiment, the second terminal encrypts, by using the private key of the second terminal, the first exchange key (that is, an exchange text or a public value) generated by the DH algorithm to generate an unreadable ciphertext Dsk (that is, the first encrypted data in the foregoing embodiment), and then transmits the first encrypted data Dsk to the first terminal. After receiving the first encrypted data, the first terminal performs decryption Decrypt operation by using the public key of the second terminal, to obtain the first exchange key. Optionally, after receiving the first encrypted data, the first terminal may perform signature verification on the first encrypted data by using the public key, and decrypt the first encrypted data if the verification succeeds.

By the foregoing embodiment, the second terminal encrypts and transmits, by using the RSA algorithm, the public value (that is, the first exchange key in the foregoing embodiment) generated by the DH algorithm, so that after intercepting the data transmission request, an attacker needs to decrypt the RSA algorithm before launching a man-in-the-middle attack, thereby increasing the decryption difficulty.

Figure 6:
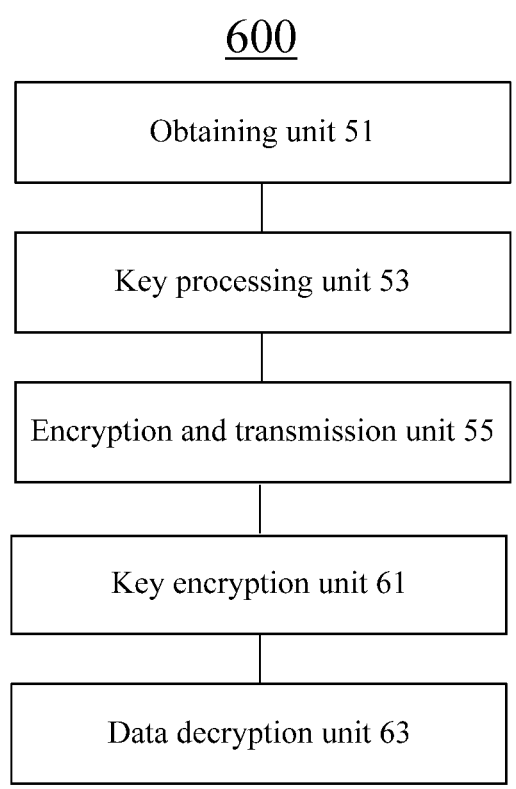
FIG. 6 is a schematic diagram of another optional data transmission apparatus according to an embodiment of the present disclosure.

According to the foregoing embodiment of the embodiments of the present disclosure, a data transmission apparatus 600 may build upon the data transmission apparatus 500 by further including a key encryption unit 61 and a data decryption unit 63, as shown in FIG. 6. The key encryption unit 61 is configured to: before the encrypted to-be-transmitted data is sent to the second terminal, encrypt a second key public value of the first terminal by using the public key of the second terminal to obtain second encrypted data, and the first terminal sends the second encrypted data to the second terminal, the second key public value being used for indicating the shared key obtained by the second terminal.

The data decryption unit 63 is configured to: after the encrypted to-be-transmitted data is sent to the second terminal, decrypt the encrypted to-be-transmitted data by using the shared key to obtain the to-be-transmitted data, the shared key being obtained by the second terminal according to the second key public value after the second terminal decrypts the second encrypted data by using the private key of the second terminal to obtain the second key public value.

It should be noted that in the DH algorithm, Kb and n sent by the first terminal B to the second terminal A are the second exchange key of the first terminal in the embodiments of this application.

In the foregoing embodiment, when sending the second exchange key of the first terminal to the second terminal, the first terminal also encrypts the second exchange key by using the public key of the second terminal to obtain the second encrypted data, and sends the second encrypted data to the second terminal. After receiving the second encrypted data, the second terminal decrypts the second encrypted data by using the private key of the second terminal to obtain the second exchange key, and obtains the shared key (the shared key is obtained by using the algorithm of the shared key in the DH algorithm) according to the second exchange key.

By the foregoing embodiment of the present disclosure, when the second terminal and the first terminal exchange their exchange keys, the second terminal and the first terminal can encrypt the exchange keys of the two terminals by using the RSA algorithm, so that after intercepting the data transmission request, an attacker needs to decrypt the RSA algorithm before launching a man-in-the-middle attack, thereby increasing the decryption difficulty.

Further, after obtaining the shared key, the second terminal and the first terminal may encrypt the to-be-transmitted data by using the shared key.

Specifically, the key processing unit may include: a verification module, configured to verify validity of the data transmission request by using verification information of the second terminal, the data transmission request further carrying the verification information of the second terminal; and a key decryption module, configured to decrypt the first encrypted data by using the public key of the second terminal to obtain the first exchange key, if it is verified that the data transmission request is a valid request.

By the foregoing embodiment, validity of the second terminal may be effectively verified, so as to avoid an access by a decrypted second terminal to the first terminal.

In an optional embodiment, the verification module may include: a signature obtaining module, configured to obtain, from the verification information, an encrypted signature obtained by encrypting, by using the private key of the second terminal, a signature installed on an application program of the second terminal, the application program being used for generating the data transmission request, and the signature of the application program being used for recording author information of the application program; a signature decryption module, configured to decrypt the encrypted signature by using the public key of the second terminal, to obtain the signature of the application program; and a determining module, configured to determine whether the data transmission request is valid based on the signature of the application program obtained by decryption.

Specifically, the determining module may include: a comparison submodule, configured to compare whether the signature of the application program obtained by decryption is the same as a signature of the application program pre-stored in the first terminal; and a validity determining submodule, configured to: determine that the data transmission request is valid, if it is found after comparison that the signature of the application program obtained by decryption is the same as the signature of the first terminal pre-stored in the application program; or an invalidity determining submodule, configured to: determine that the data transmission request is invalid, if it is found after comparison that the signature of the application program obtained by decryption is not the same as the signature of the first terminal pre-stored in the application program.

The application program in the foregoing embodiment may be an android application program, and the signature of the application program may be an android signature file. Due to uniqueness of an android signature, if an attacker succeeds in decrypting the second terminal but lacks the android signature file, the first terminal still identifies that the data transmission request is an invalid request. In this embodiment, by the signature of the application program, it may further ensure that an invalid terminal cannot access the first terminal.

It should be noted that the signature obtaining module may include a signature encryption submodule, configured to obtain the encrypted signature that is obtained by encrypting an information abstract of the signature of the application program by using the private key of the second terminal.

By the foregoing embodiment, the signature of the application program is strictly kept as secret.

It should be noted that the signature of the application program and the public value of the DH algorithm may be encrypted as an entity by using the RSA algorithm; or the signature of the application program and the public value of the DH algorithm may be separately encrypted by using the RSA algorithm. This is not limited in this application.

In an another optional embodiment, the verification module may include: a time stamp obtaining submodule, configured to obtain, from the verification information, an encrypted time stamp that is obtained by encrypting a requested time stamp by using the private key of the second terminal, the requested time stamp being used for recording a time point at which the second terminal generates the data transmission request; a time stamp decryption submodule, configured to decrypt the encrypted time stamp by using the public key of the second terminal, to obtain the requested time stamp; an identifier obtaining submodule, configured to obtain a terminal identifier of the second terminal from the data transmission request; a reading submodule, configured to obtain a recorded time stamp that is recorded in the first terminal and that has the terminal identifier; and a determining submodule, configured to determine that the data transmission request is invalid, if the requested time stamp obtained by decryption is the same as the recorded time stamp recorded in the first terminal.

In the foregoing embodiment, to effectively prevent the first terminal from being attacked by a simulated request, the data transmission request may be verified by using the time stamp in the data transmission request.

Specifically, the time stamp at which the application program of the second terminal generates the data transmission request may be encrypted to obtain the encrypted time stamp, and the encrypted time stamp is sent to the first terminal along with the data transmission request.

It should be noted that the signature of the application program, the time stamp, and the public value of the DH algorithm may be encrypted as an entity by using the RSA algorithm; or the signature of the application program, the time stamp, and the public value of the DH algorithm may be separately encrypted by using the RSA algorithm. This is not limited in this application.

In another optional embodiment, the first terminal may determine whether the data transmission request is a valid request based on a co-verified result of the signature of the application program and the requested time stamp.

Specifically, if the signature of the application program obtained by means of decryption is the same as the signature of the application program stored in the first terminal, and the recorded time stamp that is recorded in the first terminal and that has the terminal identifier does not have a time stamp the same as the requested time stamp obtained by decryption, it is determined that the data transmission request is valid. Otherwise, the data transmission request is invalid.

In the foregoing embodiment of the present disclosure, the first terminal is a server, and the second terminal is a client; or the second terminal is a server, and the first terminal is a client.

Modules provided in this embodiment may use the same method and application scenario as those provided in corresponding steps in the method embodiments. Certainly, it should be noted that the solution related to the modules may not be limited to the content and scenario in the foregoing embodiment, and the modules may be run on a computer terminal or a mobile terminal and implemented by software or hardware.

According to an embodiment of the present disclosure, a terminal or a server type of computing device for implementing the data transmission method and apparatus is further provided.

Figure 7:
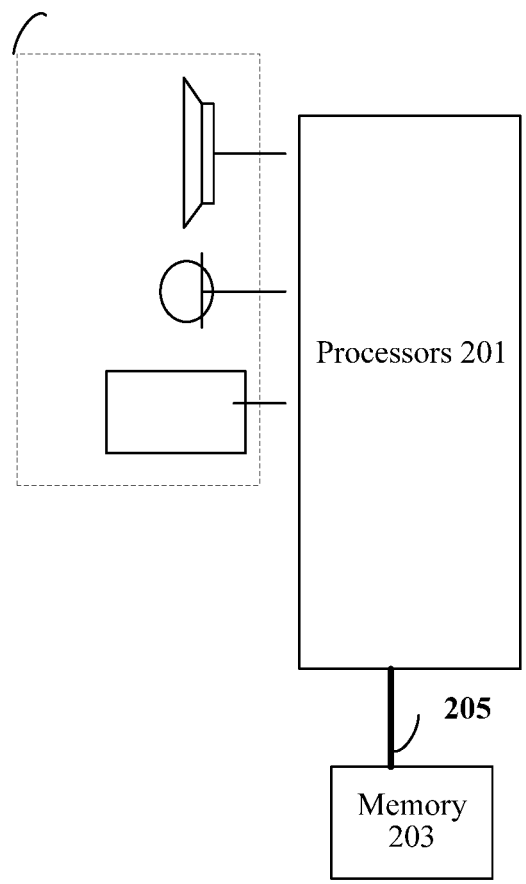
FIG. 7 is a schematic diagram of an internal structure of a terminal according to an embodiment of the present disclosure.

As shown in FIG. 7, the server or the terminal type of computing device 700 includes: one or more (only one is shown in the figure) processors 201, a memory 203, and a transmission apparatus 205 (for example, the sending apparatus in the foregoing embodiments). As shown in FIG. 7, the computing device 700 may further include an input and output device 207.

The memory 203 may be configured to store a software program and module, for example, program instructions/modules corresponding to the data transmission method and apparatus in the embodiments of the present disclosure. The processor 201 runs the software program and module in the memory 203 to implement various function application and data processing, that is, implement the data transmission method. The memory 203 may include a high speed random access memory, and may further include a non-volatile memory, for example, one or more magnetic storage apparatuses, a flash memory, or another non-volatile solid-state memory. In some examples, the memory 203 may further include a memory disposed remote to the processor 201, and the memory may be connected to the terminal through a network. Examples of the network include, but are not limited to, the Internet, an intranet, a local area network, a mobile communications network, or a combination thereof.

The transmission apparatus 205 is configured to receive or send data by a network, or may further be configured to transmit data between the processor and the memory. A specific example of the network may include a wired network and a wireless network. In an example, the transmission apparatus 205 includes a network interface controller (NIC), which may be connected to another network device and router by using a cable, so as to communicate with the Internet or the local area network. In an example, the transmission apparatus 205 is a radio frequency (RF) module, which communicates with the Internet in a wireless manner.

The memory 203 is configured to store instructions for an application program.

In this embodiment, the processor 201 of the computing device 700 may perform the following steps in the data transmission method:

obtaining, by a first terminal, a data transmission request sent by a second terminal, the data transmission request at least carrying first encrypted data that is obtained by encrypting first exchange key of the second terminal by using a private key of the second terminal; decrypting, by the first terminal, the first encrypted data by using a public key of the second terminal to obtain the first exchange key, and obtaining a shared key of the first terminal and the second terminal according to the first exchange key; and encrypting, by the first terminal, to-be-transmitted data by using the shared key to obtain encrypted to-be-transmitted data, and sending the encrypted to-be-transmitted data to the second terminal.

By the foregoing embodiment, when exchange keys of a second terminal and a first terminal are exchanged by using the DH algorithm (the exchange keys may be public values of the DH algorithm of the two terminals), the second terminal encrypts the exchange key by using the RSA algorithm, that is, the second terminal encrypts the exchange key by using a private key of the second terminal, and the first terminal decrypts the exchange key by using a public key of the second terminal, to obtain the exchange key of the second terminal and obtain a shared key of the second terminal and the first terminal. In the foregoing process, an attacker needs to decrypt an encrypted exchange key before launching a man-in-the-middle attack, thereby increasing the decryption difficulty. By the foregoing solution, security in a data transmission process is improved, and a technical problem that an encryption algorithm existing in the existing technology has poor security during data transmission is resolved.

In the DH algorithm, Ka and n sent by the second terminal A to the first terminal B are the first exchange key of the second terminal in the embodiments of this application. The second terminal encrypts the first exchange key of the second terminal by using the public key cipher RSA algorithm.

The processor 201 may further perform the following steps in the data transmission method: before sending the encrypted to-be-transmitted data to the second terminal, encrypting, by the first terminal, a second key public value of the first terminal by using the public key of the second terminal to obtain second encrypted data, and sending the second encrypted data to the second terminal, the second key public value being used for indicating the shared key obtained by the second terminal; and after the sending the encrypted to-be-transmitted data to the second terminal, decrypting, by the second terminal, the encrypted to-be-transmitted data by using the shared key to obtain the to-be-transmitted data, the shared key being obtained by the second terminal according to the second key public value after the second terminal decrypts the second encrypted data by using the private key of the second terminal to obtain the second key public value.

The processor 201 may further perform the following steps in the data transmission method: verifying, by the first terminal, validity of the data transmission request by using the verification information of the second terminal; and decrypting, by the first terminal, the first encrypted data by using the public key of the second terminal to obtain the first exchange key, if it is verified that the data transmission request is a valid request.

The processor 201 may further perform the following steps in the data transmission method: obtaining, from the verification information, an encrypted signature obtained by encrypting, by using the private key of the second terminal, a signature installed on an application program of the second terminal, the application program being used for generating the data transmission request, and the signature of the application program being used for recording author information of the application program; decrypting the encrypted signature by using the public key of the second terminal, to obtain the signature of the application program; and determining whether the data transmission request is valid based on the signature of the application program obtained by decryption.

The processor 201 may further perform the following steps in the data transmission method: comparing whether the signature of the application program obtained by decryption is the same as a signature of the application program pre-stored in the first terminal; and determining that the data transmission request is valid, if it is found after comparison that the signature of the application program obtained by decryption is the same as the signature of the first terminal pre-stored in the application program; or determining that the data transmission request is invalid, if it is found after comparison that the signature of the application program obtained by decryption is not the same as the signature of the first terminal pre-stored in the application program.

The processor 201 may further perform the following step in the data transmission method: obtaining the encrypted signature that is obtained by encrypting an information abstract of the signature of the application program by using the private key of the second terminal.

The processor 201 may further perform the following steps in the data transmission method: obtaining, from the verification information, an encrypted time stamp that is obtained by encrypting a requested time stamp by using the private key of the second terminal, the requested time stamp being used for recording a time point at which the second terminal generates the data transmission request; decrypting the encrypted time stamp by using the public key of the second terminal, to obtain the requested time stamp; obtaining a terminal identifier of the second terminal from the data transmission request; obtaining a recorded time stamp that is recorded in the first terminal and that has the terminal identifier; and determining that the data transmission request is invalid, if the requested time stamp obtained by decryption is the same as the recorded time stamp recorded in the first terminal.

A person of ordinary skill in the art may understand that the computing device 700 shown in FIG. 7 is merely an example, and the computing device 700 may be a terminal device such as a smartphone (for example, an Android mobile phone and an iOS mobile phone), a tablet computer, a palmtop computer, a mobile Internet device (MID), or a PAD. The structure of the computing device 700 is not limited in FIG. 7. For example, the computing device 700 may further include more or less components (for example, a network interface and a display apparatus) than those shown in FIG. 7, or have configuration different with that shown in FIG. 7.

A person of ordinary skill in the art may understand that all or a part of the steps of the methods in the embodiments may be implemented by a program by instructing hardware relevant to a terminal device. The program may be stored in a computer readable storage medium, and the storage medium may be a flash drive, a ROM, a RAM, a magnetic disk, an optical disk, and so on.

Optionally, for a specific example of this embodiment, refer to the examples described in the foregoing embodiments, and details are not described herein again in this embodiment.

An embodiment of the present disclosure further provides a storage medium. Optionally, in this embodiment, the storage medium may be configured to store program code executed in the data transmission method provided in the foregoing embodiments.

Optionally, in this embodiment, the storage medium may be located in any computer terminal in a computer terminal cluster in a computer network, or in any mobile terminal in a mobile terminal cluster.

Optionally, in this embodiment, the storage medium is configured to store the program code used for executing the following steps:

S1: A first terminal obtains a data transmission request sent by a second terminal, the data transmission request at least carrying first encrypted data that is obtained by encrypting first exchange key of the second terminal by using a private key of the second terminal.

S2: The first terminal decrypts the first encrypted data by using a public key of the second terminal to obtain the first exchange key, and obtains a shared key of the first terminal and the second terminal according to the first exchange key.

S3: The first terminal encrypts to-be-transmitted data by using the shared key to obtain encrypted to-be-transmitted data, and sends the encrypted to-be-transmitted data to the second terminal.

By the foregoing embodiment, when exchange keys of a second terminal and a first terminal are exchanged by using the DH algorithm (the exchange keys may be public values of the DH algorithm of the two terminals), the second terminal encrypts the exchange key by using the RSA algorithm, that is, the second terminal encrypts the exchange key by using a private key of the second terminal, and the first terminal decrypts the exchange key by using a public key of the second terminal, to obtain the exchange key of the second terminal and obtain a shared key of the second terminal and the first terminal. In the foregoing process, an attacker needs to decrypt an encrypted exchange key before launching a man-in-the-middle attack, thereby increasing the decryption difficulty. By the foregoing solution, security in a data transmission process is improved, and a technical problem that an encryption algorithm existing in the existing technology has poor security during data transmission is resolved.

In the DH algorithm, Ka and n sent by the second terminal A to the first terminal B are the first exchange key of the second terminal in the embodiments of this application. The second terminal encrypts the first exchange key of the second terminal by using the public key cipher RSA algorithm.

The storage medium is further configured to store the program code used for executing the following steps: before the sending the encrypted to-be-transmitted data to the second terminal, encrypting, by the first terminal, a second key public value of the first terminal by using the public key of the second terminal to obtain second encrypted data, and sending the second encrypted data to the second terminal, the second key public value being used for indicating the shared key obtained by the second terminal; and after the sending the encrypted to-be-transmitted data to the second terminal, decrypting, by the second terminal, the encrypted to-be-transmitted data by using the shared key to obtain the to-be-transmitted data, the shared key being obtained by the second terminal according to the second key public value after the second terminal decrypts the second encrypted data by using the private key of the second terminal to obtain the second key public value.

The storage medium is further configured to store the program code used for executing the following steps: verifying, by the first terminal, validity of the data transmission request by using the verification information of the second terminal; and decrypting, by the first terminal, the first encrypted data by using the public key of the second terminal to obtain the first exchange key, if it is verified that the data transmission request is a valid request.

The storage medium is further configured to store the program code used for executing the following steps: obtaining, from the verification information, an encrypted signature obtained by encrypting, by using the private key of the second terminal, a signature installed on an application program of the second terminal, the application program being used for generating the data transmission request, and the signature of the application program being used for recording author information of the application program; decrypting the encrypted signature by using the public key of the second terminal, to obtain the signature of the application program; and determining whether the data transmission request is valid based on the signature of the application program obtained by decryption.

The storage medium is further configured to store the program code used for executing the following steps: comparing whether the signature of the application program obtained by decryption is the same as a signature of the application program pre-stored in the first terminal; and determining that the data transmission request is valid, if it is found after comparison that the signature of the application program obtained by decryption is the same as the signature of the first terminal pre-stored in the application program; or determining that the data transmission request is invalid, if it is found after comparison that the signature of the application program obtained by decryption is not the same as the signature of the first terminal pre-stored in the application program.

The storage medium is further configured to store the program code used for executing the following step: obtaining the encrypted signature that is obtained by encrypting an information abstract of the signature of the application program by using the private key of the second terminal.

The storage medium is further configured to store the program code used for executing the following steps: obtaining, from the verification information, an encrypted time stamp that is obtained by encrypting a requested time stamp by using the private key of the second terminal, the requested time stamp being used for recording a time point at which the second terminal generates the data transmission request; decrypting the encrypted time stamp by using the public key of the second terminal, to obtain the requested time stamp; obtaining a terminal identifier of the second terminal from the data transmission request; obtaining a recorded time stamp that is recorded in the first terminal and that has the terminal identifier; and determining that the data transmission request is invalid, if the requested time stamp obtained by decryption is the same as the recorded time stamp recorded in the first terminal.

Optionally, in this embodiment, the foregoing storage medium includes, but is not limited to: any medium that can store program code, such as a USB flash drive, a ROM, a RAM, a removable hard disk, a magnetic disk, or an optical disc.

Optionally, for a specific example of this embodiment, refer to the examples described in the foregoing embodiments, and details are not described herein again in this embodiment.

The sequence numbers of the foregoing embodiments of the present disclosure are merely for illustrative purposes, and are not intended to indicate priorities of the embodiments.

When the integrated unit in the foregoing embodiments is implemented in the form of a software functional unit and sold or used as an independent product, the integrated unit may be stored in the foregoing computer-readable storage medium. Based on such understanding, the technical solutions of the embodiments of the present disclosure essentially, or the part contributing to the prior art, or all or some of the technical solutions may be implemented in the form of a software product. The computer software product is stored in a storage medium and includes several instructions for instructing one or more computer devices (which may be a personal computer, a first terminal, or a network device) to perform all or some of the steps of the methods in the embodiments of the present disclosure.

In the foregoing embodiments of the present disclosure, the description of each embodiment has a respective focus. For the part that is not detailed in an embodiment, refer to the relevant description of other embodiments.

In the several embodiments provided in this application, it should be understood that the disclosed second terminal may be implemented in another manner. The described apparatus embodiments are merely exemplary. For example, the unit division is merely logical function division and may be another division manner during actual implementation. For example, multiple units or components may be combined or integrated into another system, or some features may be ignored or not performed. In addition, the displayed or discussed mutual couplings or direct couplings or communication connections may be indirect couplings or communication connections implemented by using some interfaces, units, or modules, or may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The foregoing descriptions are merely preferred implementations of the present disclosure. It should be noted that a person of ordinary skill in the art may make several improvements or polishing without departing from the principle of the present disclosure, and the improvements or polishing shall fall within the protection scope of the present disclosure.

What is claimed is:

1. A data transmission method, comprising:
  receiving, by a first terminal, a data transmission request sent by a second terminal, the data transmission request including a first encrypted data comprised of a first exchange key of the second terminal encrypted by the second terminal using a private key of the second terminal, the data transmission request further including verification information of the second terminal;
  decrypting, by the first terminal, the first encrypted data using a public key of the second terminal by:
    verifying, by the first terminal, a validity of the data transmission request using the verification information of the second terminal by:
      obtaining, from the verification information, an encrypted signature obtained by encrypting, using the private key of the second terminal, a signature installed on an application program of the second terminal; and
    decrypting, by the first terminal, the first encrypted data using the public key of the second terminal to obtain the first exchange key, when the validity of the data transmission request is verified;
  obtaining, by the first terminal, the first exchange key based on the decryption of the first encrypted data;
  obtaining, by the first terminal, a shared key according to the first exchange key, wherein the shared key is shared between both the first terminal and the second terminal;
  encrypting, by the first terminal, a second exchange key of the first terminal using a private key of the first terminal to generate second encrypted data, the second encrypted data including the encrypted second exchange key;
  transmitting, by the first terminal, the second encrypted data to the second terminal, wherein the second terminal is configured to:
    decrypt the second encrypted data using a public key of the first terminal;
    obtain the second exchange key based on the decryption of the second encrypted data;
    obtain the shared key according to the second exchange key;
    encrypt first to-be-transmitted data using the shared key to generate encrypted first to-be-transmitted data; and
    transmit the encrypted first to-be-transmitted data to the first terminal;
  receiving, by the first terminal, the encrypted first to-be-transmitted data from the second terminal;
  decrypting, by the first terminal, the encrypted first to-be-transmitted data using the shared key;
  encrypting, by the first terminal, second to-be-transmitted response data using the shared key to generate encrypted second to-be-transmitted response data; and
  transmitting, by the first terminal, the encrypted second to-be-transmitted response data to the second terminal.

2. The method according to claim 1, wherein:
  the application program is used for generating the data transmission request, and the signature of the application program is used for recording author information of the application program; and
  verifying, by the first terminal, the validity of the data transmission request using the verification information of the second terminal, further comprises:
    decrypting the encrypted signature using the public key of the second terminal, to obtain the signature of the application program; and
    determining whether the data transmission request is valid based on the signature of the application program obtained by decryption.

3. The method according to claim 2, wherein determining whether the data transmission request is valid based on the signature of the application program obtained by decryption, comprises:
  comparing whether the signature of the application program obtained by decryption is the same as a signature of the application program pre-stored in the first terminal;
  determining the data transmission request is valid, when the signature of the application program obtained by decryption is the same as the signature of the first terminal pre-stored in the application program; and
  determining that the data transmission request is invalid, when the signature of the application program obtained by decryption is not the same as the signature of the first terminal pre-stored in the application program.

4. The method according to claim 2, wherein obtaining the encrypted signature obtained by encrypting, by using the private key of the second terminal, the signature installed on the application program of the second terminal, comprises:
  obtaining the encrypted signature obtained by encrypting an information abstract of the signature of the application program using the private key of the second terminal.

5. The method according to claim 1, wherein verifying, by the first terminal, the validity of the data transmission request by using the verification information of the second terminal, comprises:
  obtaining, from the verification information, an encrypted time stamp obtained by encrypting a requested time stamp using the private key of the second terminal, the requested time stamp being used for recording a time point at which the second terminal generates the data transmission request;

decrypting the encrypted time stamp using the public key of the second terminal, to obtain the requested time stamp;

obtaining a terminal identifier of the second terminal from the data transmission request;

obtaining a recorded time stamp recorded in the first terminal and including the terminal identifier; and determining the data transmission request is invalid, when the requested time stamp obtained by decryption is the same as the recorded time stamp recorded in the first terminal.

6. The method according to claim 1, wherein the first terminal is a server, and the second terminal is a client; or wherein the second terminal is a server, and the first terminal is a client.

7. A data transmission apparatus, comprising:

an obtaining circuitry comprising a processor and memory, the obtaining circuitry configured to:
  receive a data transmission request sent by a second terminal, the data transmission request including a first encrypted data comprised of a first exchange key of the second terminal encrypted by the second terminal using a private key of the second terminal;

a key processing circuitry comprising a processor and memory, the key processing circuitry configured to:
  decrypt the first encrypted data using a public key of the second terminal by:
    verifying a validity of the data transmission request using the verification information of the second terminal by:
      obtaining, from the verification information, an encrypted signature obtained by encrypting, using the private key of the second terminal, a signature installed on an application program of the second terminal; and
    decrypting the first encrypted data using the public key of the second terminal to obtain the first exchange key, when the validity of the data transmission request is verified;
  obtain the first exchange key based on the decryption of the first encrypted data; and
  obtain a shared key according to the first exchange key, wherein the shared key is shared between both the data transmission apparatus and the second terminal; and an encryption and transmission circuitry comprising a processor and memory, the encryption and transmission circuitry configured to:
  encrypt a second exchange key of the apparatus using a private key of the apparatus to generate second encrypted data, the second encrypted data including the encrypted second exchange key;
  transmit the second encrypted data to the second terminal, wherein the second terminal is configured to:
    decrypt the second encrypted data using a public key of the apparatus;
    obtain the second exchange key based on the decryption of the second encrypted data;
    obtain the shared key according to the second exchange key;
    encrypt first to-be-transmitted data using the shared key to generate encrypted first to-be-transmitted data; and
    transmit the encrypted first to-be-transmitted data to the apparatus;
  receive the encrypted first to-be-transmitted data from the second terminal;
  decrypt the encrypted first to-be-transmitted data using the shared key;
  encrypt second to-be-transmitted response data by using the shared key to obtain encrypted second to-be-transmitted response data; and
  transmit the encrypted second to-be-transmitted response data to the second terminal.

8. The data transmission apparatus according to claim 7, wherein:

the application program is used for generating the data transmission request, and the signature of the application program is used for recording author information of the application program the key processing circuitry further comprises:
  a signature decryption module configured to decrypt the encrypted signature using the public key of the second terminal, to obtain the signature of the application program; and
  a determining module configured to determine whether the data transmission request is valid based on the signature of the application program obtained by decryption.

9. The data transmission apparatus according to claim 8, wherein the determining module comprises:

a comparison submodule configured to compare whether the signature of the application program obtained by decryption is the same as a signature of the application program pre-stored in the first terminal;
  a validity determining submodule configured to: determine the data transmission request is valid, when the signature of the application program obtained by decryption is the same as the signature of the first terminal pre-stored in the application program; and
  an invalidity determining submodule configured to: determine the data transmission request is invalid, when the signature of the application program obtained by decryption is not the same as the signature of the first terminal pre-stored in the application program.

10. The data transmission apparatus according to claim 8, wherein the signature obtaining module comprises:

a signature encryption submodule configured to obtain the encrypted signature obtained by encrypting an information abstract of the signature of the application program by using the private key of the second terminal.

11. The data transmission apparatus according to claim 7, wherein the key processing circuitry comprises:

a time stamp obtaining submodule configured to obtain, from the verification information, an encrypted time stamp obtained by encrypting a requested time stamp using the private key of the second terminal, the requested time stamp being used for recording a time point at which the second terminal generates the data transmission request;
  a time stamp decryption submodule configured to decrypt the encrypted time stamp using the public key of the second terminal, to obtain the requested time stamp;
  an identifier obtaining submodule configured to obtain a terminal identifier of the second terminal from the data transmission request;
  a reading submodule configured to obtain a recorded time stamp recorded in the first terminal and including the terminal identifier; and
  a determining submodule configured to determine the data transmission request is invalid, when the requested time stamp obtained by decryption is the same as the recorded time stamp recorded in the first terminal.

12. The data transmission apparatus according to claim 7, wherein the data transmission apparatus is a server, and the second terminal is a client; or
  wherein the second terminal is a server, and the data transmission apparatus is a client.

13. A non-transitory storage medium storing processor executable instructions that, when executed by a processor, cause the processor to:
  receive a data transmission request sent by a second terminal, the data transmission request including a first encrypted data comprised of a first exchange key of the second terminal encrypted by the second terminal using a private key of the second terminal;
  decrypt the first encrypted data using a public key of the second terminal by:
    verifying, by the first terminal, a validity of the data transmission request using the verification information of the second terminal by:
      obtaining, from the verification information, an encrypted signature obtained by encrypting, using the private key of the second terminal, a signature installed on an application program of the second terminal; and
    decrypting, by the first terminal, the first encrypted data using the public key of the second terminal to obtain the first exchange key, when the validity of the data transmission request is verified;
  obtain the first exchange key based on the decryption of the first encrypted data;
  obtain a shared key according to the first exchange key, wherein the shared key is shared between both the first terminal and the second terminal;
  encrypt a second exchange key of a first terminal using a private key of the first terminal to generate second encrypted data, the second encrypted data including the encrypted second exchange key;
  transmit the second encrypted data to the second terminal, wherein the second terminal is configured to:
    decrypt the second encrypted data using a public key of the first terminal;
    obtain the second exchange key based on the decryption of the second encrypted data;
    obtain the shared key according to the second exchange key;
    encrypt first to-be-transmitted data using the shared key to generate encrypted first to-be-transmitted data; and
    transmit the encrypted first to-be-transmitted data to the first terminal;
  obtain the shared key according to the first exchange key;
  receive the encrypted first to-be-transmitted data from the second terminal;
  decrypt the encrypted first to-be-transmitted data using the shared key;
  encrypt second to-be-transmitted data using the shared key to obtain encrypted to-be-transmitted data; and
  transmit the encrypted second to-be-transmitted data to the second terminal.

14. The non-transitory storage medium according to claim 13, further comprising processor executable instructions that, when executed by a processor, cause the processor to:
  verify a validity of the data transmission request using a verification information of the second terminal, further by:
    decrypting the encrypted signature using the public key of the second terminal, to obtain the signature of the application program; and
    determining whether the data transmission request is valid based on the signature of the application program obtained by decryption, where:
    the application program is used for generating the data transmission request, and the signature of the application program is used for recording author information of the application program.

* * * * *